(12) United States Patent
Coli et al.

(10) Patent No.: US 10,333,615 B2
(45) Date of Patent: Jun. 25, 2019

(54) OPTOELECTRONIC MODULE MANAGEMENT PLATFORM

(71) Applicant: FINISAR CORPORATION, Sunnyvale, CA (US)

(72) Inventors: Giuliano Coli, Sunnyvale, CA (US); Rafik Ward, Menlo Park, CA (US)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

(21) Appl. No.: 15/606,793

(22) Filed: May 26, 2017

(65) Prior Publication Data

US 2017/0346554 A1 Nov. 30, 2017

Related U.S. Application Data

(60) Provisional application No. 62/342,107, filed on May 26, 2016.

(51) Int. Cl.
*G02B 6/42* (2006.01)
*H04B 10/075* (2013.01)

(52) U.S. Cl.
CPC ......... *H04B 10/075* (2013.01); *G02B 6/4212* (2013.01); *G02B 6/4246* (2013.01); *G02B 6/4249* (2013.01); *G02B 6/4293* (2013.01)

(58) Field of Classification Search
None
See application file for complete search history.

(56) References Cited

U.S. PATENT DOCUMENTS

| | | | | |
|---|---|---|---|---|
| 6,359,729 B1 * | 3/2002 | Amoruso | ............ | H04B 10/038 359/341.1 |
| 7,443,864 B1 * | 10/2008 | Johnson | ................ | H04W 92/04 370/258 |
| 2004/0028406 A1 * | 2/2004 | Bortz | ................. | H04Q 11/0005 398/49 |
| 2004/0130778 A1 * | 7/2004 | Smith | ................ | H04B 10/2935 359/337 |
| 2005/0108376 A1 * | 5/2005 | Deval | ..................... | H04L 69/40 709/223 |
| 2009/0079544 A1 * | 3/2009 | Noble | ..................... | H04Q 9/00 340/10.1 |

* cited by examiner

*Primary Examiner* — Darren E Wolf
(74) *Attorney, Agent, or Firm* — Maschoff Brennan

(57) ABSTRACT

An optoelectronic module management system includes a network connection communicatively coupled to an optoelectronic module, a memory, and a processing device operatively coupled to the memory. The processing device is configured to perform or control performance of operations that include identify the optoelectronic module via a management network. The optoelectronic module includes a management communication element that is communicatively coupled to the management network and an optical communication element that is communicatively coupled to a fiber optic cable. The operations further include add the optoelectronic module to a list of monitored devices, monitor the optoelectronic module, provide a service to the optoelectronic module in response to the monitoring, and generate a report of the service provided to the optoelectronic module.

20 Claims, 6 Drawing Sheets

OPTOELECTRONIC MODULE MANAGEMENT PLATFORM

RELATED APPLICATION

This application claims the benefit under 35 U.S.C. § 119(e) of U.S. Provisional Application No. 62/342,107, filed on May 26, 2016.

FIELD

The embodiments discussed herein are related to an optoelectronic module management platform.

BACKGROUND

Unless otherwise indicated herein, the materials described herein are not prior art to the claims in the present application and are not admitted to be prior art by inclusion in this section.

Light signals (which may also be referred to as "optical signals") may be used to rapidly and reliably transmit information in a variety of applications such as fiber optic networks or computer systems. Fiber optic networks have various advantages over other types of networks such as copper wire based networks. Many existing copper wire networks operate at near maximum possible data transmission rates and at near maximum possible distances for copper wire technology. Fiber optic networks may be used to reliably transmit data at higher rates over further distances than is possible with copper wire networks.

The subject matter claimed herein is not limited to implementations that solve any disadvantages or that operate only in environments such as those described above. Rather, this background is only provided to illustrate one example technology area where some implementations described herein may be practiced.

BRIEF DESCRIPTION OF THE DRAWINGS

Example embodiments will be described and explained with additional specificity and detail through the use of the accompanying drawings in which:

FIG. 5 illustrates another embodiment of a construction toy that includes a housing and at least one electromagnetic connector.

DETAILED DESCRIPTION OF SOME EXAMPLE EMBODIMENTS

Techniques described herein relate to an optoelectronic module management platform and may address some shortcomings associated with managing conventional optoelectronic modules. Systems and methods described herein may overcome at least some limitations of conventional network management software, for example, by enabling remote monitoring, secure identification, performance analysis, failure downtime prevention, software feature upgrades, and/or counterfeit prevention with the use of optics modules that may independently connect to internet services or other network. Techniques described herein may be used for any type of optoelectronic module, such as all variants of transceivers (e.g., SFP, SFP+, SFF, XFP, QSFP form factors), single- and multi-lane active optical cables ("AOC"), transponders (e.g., CFP), and board-mounted optics (e.g., board-mount optoelectronic assembly, "BOA"). Techniques described herein be used to overcome at least some limitations of managing datacenter networks, Local or Metro Area Networks, and/or wireless front- and back-haul networks, which may have limited access to the software and/or hardware features of optoelectronic modules that may carry electrical/optical traffic.

An optoelectronic module management system includes a network connection communicatively coupled to an optoelectronic module, a memory, and a processing device operatively coupled to the memory. The processing device is configured to perform or control performance of operations that include identify the optoelectronic module via a management network. The optoelectronic module includes a management communication element that is communicatively coupled to the management network and an optical communication element that is communicatively coupled to a fiber optic cable. The operations further include add the optoelectronic module to a list of monitored devices, monitor the optoelectronic module, provide a service to the optoelectronic module in response to the monitoring, and generate a report of the service provided to the optoelectronic module.

Figure 1:
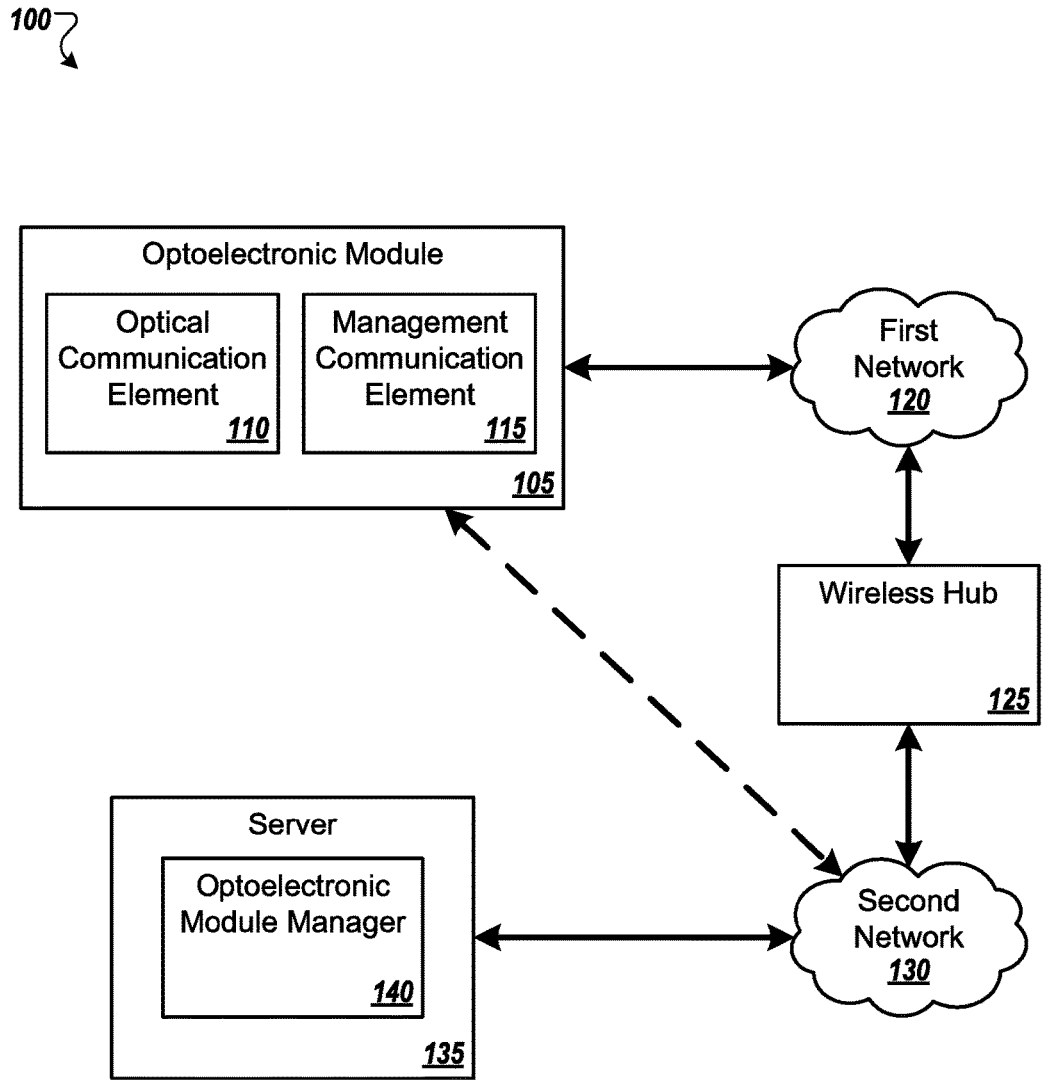
FIG. 1 illustrates an example network diagram of a management network to manage one or more optoelectronic modules.

FIG. 1 illustrates an example network diagram of a management network 100 to manage one or more optoelectronic modules 105. The management network 100 may include one or more optoelectronic modules 105 that may each be operatively connected to a wireless hub 125 via a first network 120. The wireless hub 125 may be operatively connected to a server 135 via a second network 130 included in the management network 100. The server 130 may include an optoelectronic module manager 140 that may communicate with the one or more optoelectronic modules 105 via the second network 130, the wireless hub 125 and the first network 120.

The optoelectronic module 105 may include any type of optical or optoelectronic device, such as a transceiver, optical cable, transponder, board-mounted optical assembly, or other optoelectronic module. The optoelectronic module 105 may include an optical communication element 110 that may be configured to handle any number of optical channels, one or more of which may be configured to communicate data. The optoelectronic module 105 may be implemented as part of a fiber optic network (not illustrated) and/or a computing system. In some configurations, the optoelectronic module 105 may be used to convert electrical signals to optical signals which then travel through fiber optic cables of the fiber optic network. Additionally or alternatively, the optoelectronic module 105 may convert optical signals to electrical signals. The optoelectronic module 105 may be configured to receive either one or multiple electrical signals and/or optical signals. The optoelectronic module 105 may also be configured to output either one or multiple electrical signals and/or optical signals.

The optoelectronic module 105 may include a management communication element 115 that may receive instructions and requests from the server 135 and/or may communicate responses and/or other data to the server 135. The management communication element 115 may communicate with the server 135 independent of any traffic carried by the optical communication element 110 or independently from any cable, fiber, card or device that is connected to the optical communication element 110. The management communication element 115 may be configured to connect to the first network 120 and to the wireless hub 125 via the first network 120. The management communication element 115 may be hardware-based and may include memory and a processor configured to execute instructions, such as instructions received from the server 135 and/or instructions stored in the memory or other non-transitory computer-readable media of the optoelectronic module 105.

The first network 120 and the second network 130 may include any type of network. In general, the first network 120 and the second network 130 may each include one or more wide area networks (WANs) and/or local area networks (LANs) that enable the optoelectronic module 105, the wireless hub 125 and the server 135 to communicate with each other. In some embodiments, the first network 120 includes a LAN and the second network 130 includes the Internet (e.g., a global internetwork formed by logical and physical connections between multiple WANs and/or LANs). Alternately or additionally, the first network 120 and/or the second network 130 may include one or more cellular RF networks and/or one or more wired and/or wireless networks such as, but not limited to, 802.xx networks, Bluetooth access points, wireless access points, IP-based networks, or the like. The first network 120 and/or the second network 130 may also include servers that enable one type of network to interface with another type of network. The first network 120 may include the same or different type of network as the second network 130. In at least one embodiment, the first network 120 includes a wireless network and the second network 130 includes a wired network. The wireless hub 125 may be configured to communicatively connect to the optoelectronic module 105. A secure connection (e.g., Bluetooth® or WiFi®) may be established between the wireless hub 125 and the optoelectronic module 105. The wireless hub 125 may include a router, an access point, a wireless dongle, etc.

The wireless hub 125 may connect to the second network 130 via a wired connection (e.g., Ethernet RJ-45) or a wireless connection. In at least one embodiment, the wireless hub 125 may be included in optoelectronic module form factors that plug into communications equipment (e.g., servers, routers, switches) and operate also as wireless routers. In at least one embodiment, the optoelectronic module 105 may wirelessly connect directly to the second network 130 and the first network 120 and the wireless hub 125 may be omitted. Alternatively, the optoelectronic module 105 may connect to the second network 130 via at least one (but not necessarily both) of the first network 120 or the wireless hub 125. In at least one embodiment, the optoelectronic module 105 may include the wireless hub 125. In such embodiments, the optoelectronic module 105 may perform or extend wireless operation using one or more antennas embedded in a pull-tab, bail latch or within a case of the optoelectronic module 105. In at least one embodiment, the optoelectronic module 105 and a second optoelectronic module (not illustrated) may be connected to each other (and to other optoelectronic modules) in a mesh network configuration.

The server 135 may include one or more computing devices, (such as a rackmount server, a router computer, a server computer, a personal computer, a mainframe computer, a laptop computer, a web server, a proxy server, a desktop computer, etc.), data stores (e.g., hard disks, memories, databases), networks, software components, and/or hardware components.

The optoelectronic module manager 140 may monitor operations of the optoelectronic module 105. The optoelectronic module manager 140 may remotely provide services for the optoelectronic module 105. Example services may include enabling operation of the optoelectronic module 105, enabling or upgrading software and/or hardware features of the optoelectronic module 105, monitoring performance of the optoelectronic module 105, identifying a potential or actual failure of the optoelectronic module 105, issuing a warning or notifications for failure downtime prevention, switching pull-tabs or bail latches LED(s) ON or OFF, identifying characteristics of optical cables connected to the optoelectronic module 105, identifying characteristics of data transmissions through optical cables connected to the optoelectronic module 105, using the optoelectronic module 105 to implement similar control and features for the optoelectronic module(s) it transmit to and receive from the other end of the fiber link, reporting information concerning the host (switch, router, line card, etc.) the optoelectronic module 105 operates into, such host's ID, performance metrics, number of the port the optoelectronic module operate into, etc., and exchanging host-specific information (e.g., commands, software updates, etc.) by using the optoelectronic module 105, the networks 120 and 130 and the optoelectronic module manager 140 as a dedicated communication mean, alternative to the main data network software.

Figure 2:
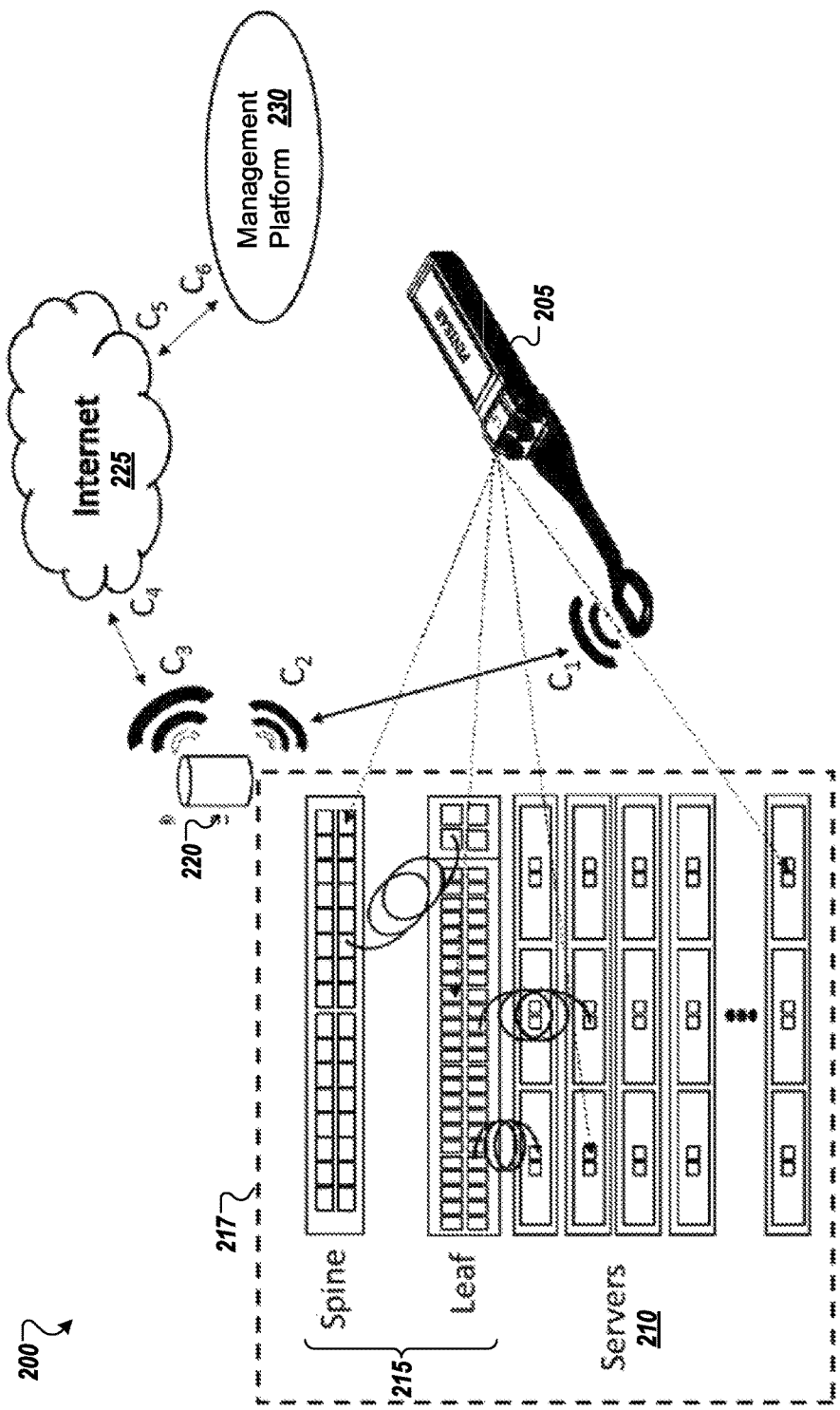
FIG. 2 illustrates an example operating environment with one or more transceivers operating in one or more servers and/or switches of a rack in a datacenter.

FIG. 2 illustrates an example operating environment 200 with one or more transceivers 205 operating in one or more servers 210 and/or switches 215 (e.g., ToR leafs and spine switches) of a rack in a datacenter 217. The transceivers 205 may be the same or similar to or include the optoelectronic module 105 of FIG. 1. After the one or more transceivers 205 power up, the one or more transceivers 205 may each establish a secure wireless connection (e.g., $C_1$-$C_2$) with a wireless hub 220 (e.g., wireless hub 125 of FIG. 1). The secure wireless connection may include a Bluetooth® or WiFi® connection. The wireless hub 220 may be placed in the proximity of the rack. Some embodiments may include multiple wireless hubs 220. Some transceivers 205 may connect to a first wireless hub while other transceivers 205 may connect to a second wireless hub. In at least one embodiment, one or more transceivers 205 may include an antenna. The antenna may be embedded in the transceiver, such as in a pull-tab of the transceiver. The antenna may extend the wireless range to cover more ports and devices in the rack.

In at least one embodiment, the wireless hub 220 may connect to the Internet 225 via a wireless connection ($C_3$-$C_4$) at the datacenter 217, and in turn to a management platform 230, thus enabling remote secure communication between the management platform 230 and the transceivers 205 in the datacenter 217. The management platform 230 of FIG. 2 may include or correspond to the server 135 of FIG. 1. System administrators of the datacenter 217 may connect to the management platform 230 to manage and monitor the transceivers 205 at the datacenter 217. In at least one embodiment, the wireless hub 220 may be implemented as a dongle that conforms to a standard optical module form factor that plugs into a switch and may operate as a wireless router. Examples of such standard optical module form factors to which the dongle may conform may include the SFP multisource agreement (MSA), the SFP+ MSA, the SFF MSA, the XFP MSA, and the QSFP MSA.

Figure 3:
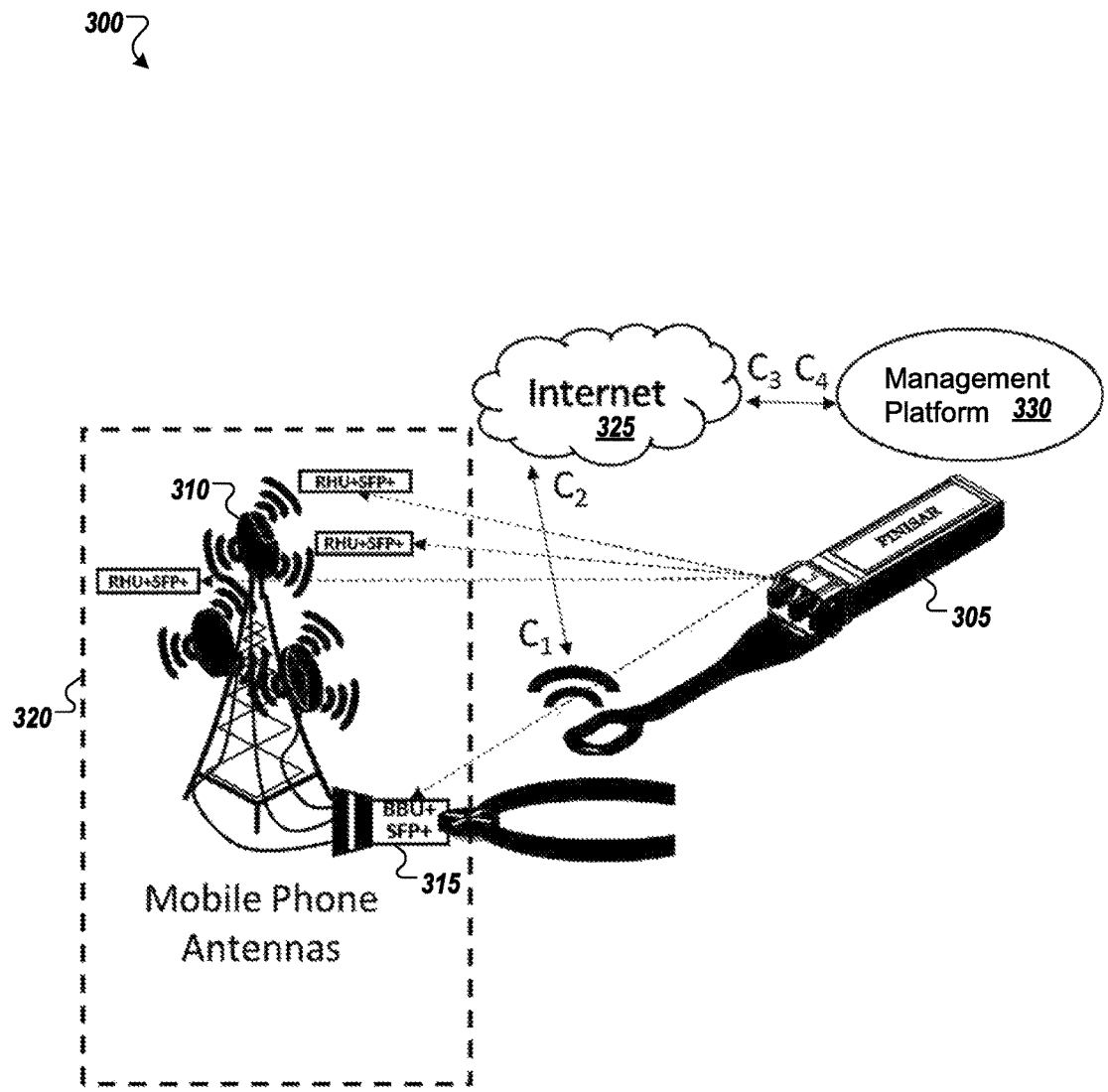
FIG. 3 illustrates an example operating environment with one or more transceivers operating as or part of one or more radio remote head units and/or base band units of a mobile phone antenna set.

FIG. 3 illustrates an example operating environment 300 with one or more transceivers 305 operating as or part of one or more radio remote head units 310 and/or base band units 315 of a mobile phone antenna set 320. A radio remote head unit 310 may include a remote radio transceiver that may connect to an operator radio control panel via electrical or wireless interface(s). A base band unit 315 may include a unit that processes baseband in telecomm systems. The base band unit 315 may include a digital signal processor to process forward voice signals and data between mobile devices. The radio remote head unit 310 and base band unit 315 may be coupled via an optical fiber.

After a transceiver 305 powers up, the transceiver 305 may establish a secure cellular connection ($C_1$-$C_2$) to the Internet 325 and, in turn, connect to a management platform 330, thus enabling remote secure communication between the management platform 330 and the transceiver 305, independently from the data traffic the transceiver 305 may carry for the cellular network. The management platform 330 of FIG. 3 may include or correspond to the server 135 of FIG. 1.

Figure 4:
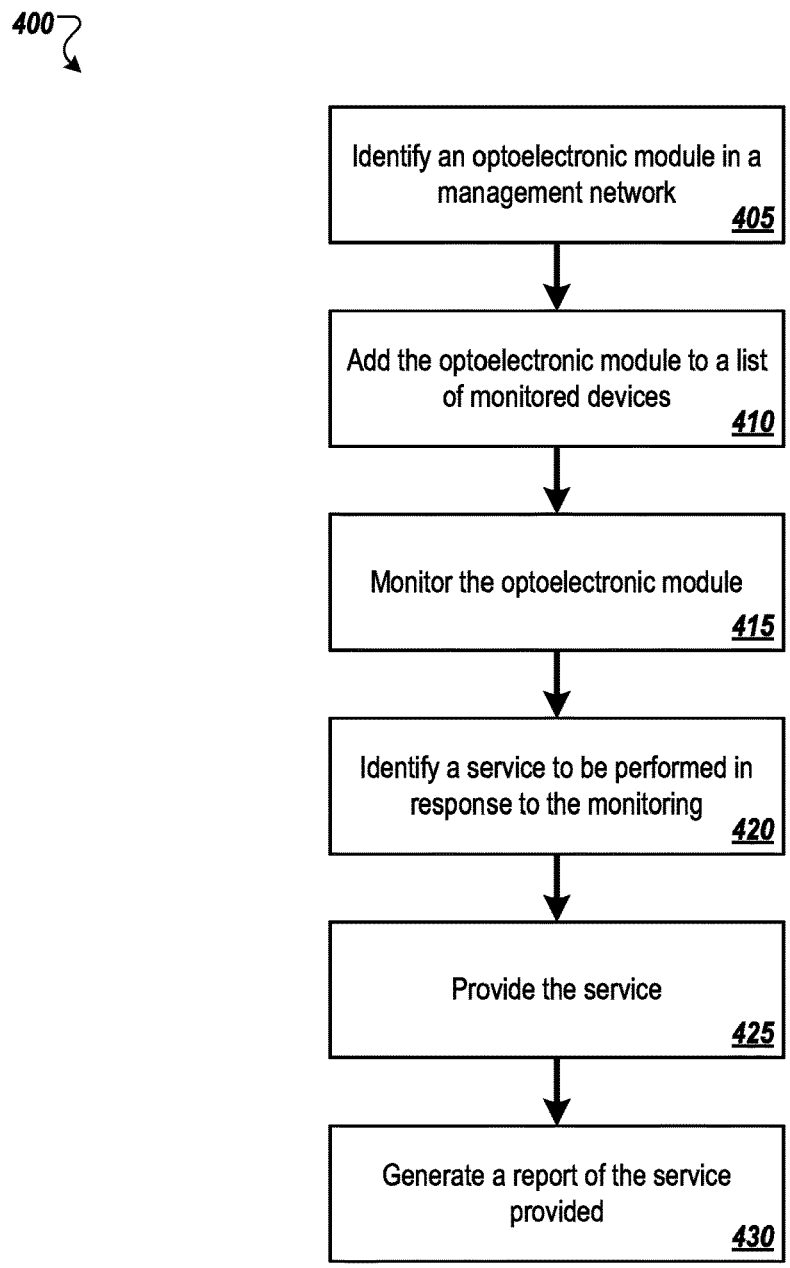
FIGS. 4-5 illustrate flow diagrams of example methods related to optoelectronic module management.
Figure 5:
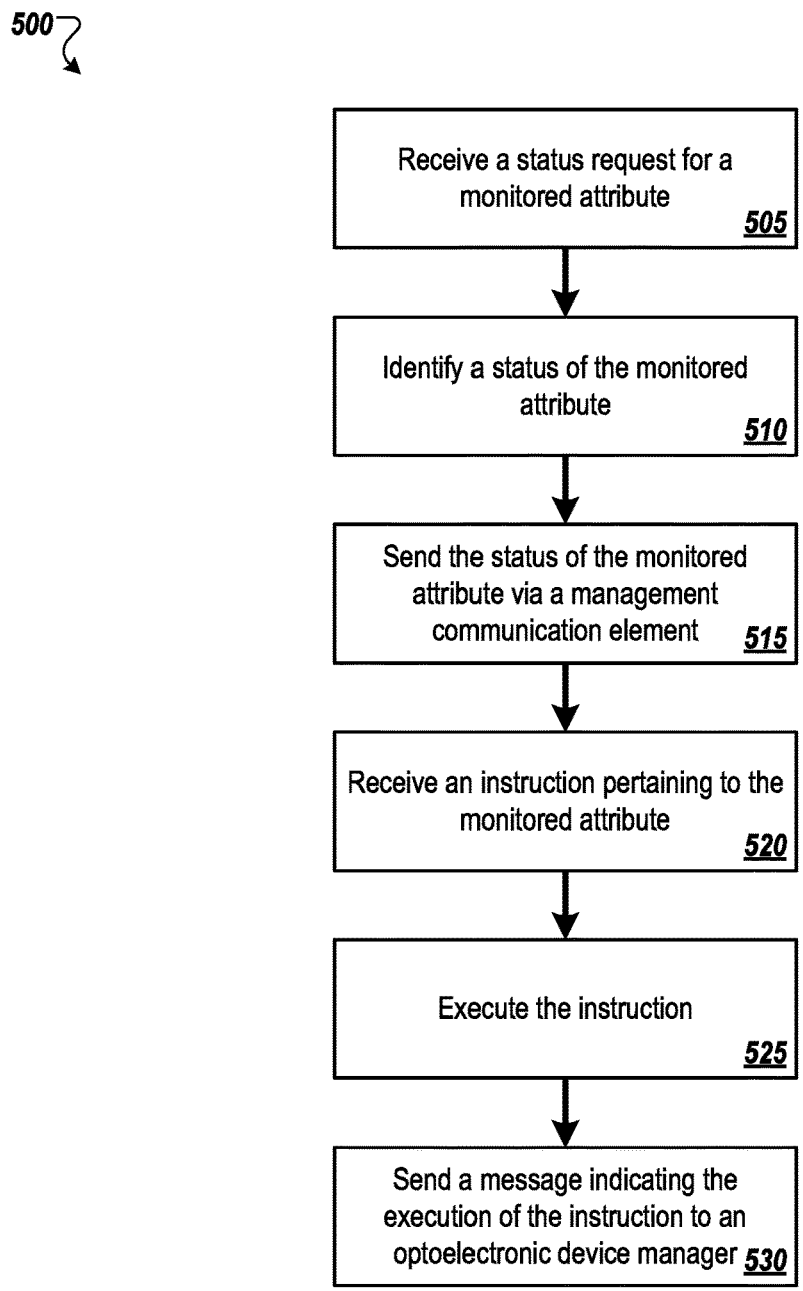

FIGS. 4-5 illustrate flow diagrams of example methods 400 and 500 related to optoelectronic module management. The methods may be performed by processing logic that may include hardware (circuitry, dedicated logic, etc.), software (such as is run on a general purpose computer system or a dedicated machine), or a combination of both, which processing logic may be included in the management network 100 of FIG. 1, the management platform 230 of FIG. 2, and/or the management platform 330 of FIG. 3, or another computer system or device. However, another system, or combination of systems, may be used to perform the methods. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any non-transitory computer-readable device or storage media. Although illustrated as discrete blocks, various blocks may be divided into additional blocks, combined into fewer blocks, or eliminated, depending on the desired implementation.

In more detail, the method 400 includes a method to remotely manage an optoelectronic module. The optoelectronic module may include the optoelectronic module 105 of FIG. 1, the transceiver 205 of FIG. 2, or the transceiver 305 of FIG. 3. The method 400 may be performed, for example, by the optoelectronic module manager 140 of FIG. 1, the management platform 230 of FIG. 2, and/or the management platform 330 of FIG. 3, or another computer system or device. The optoelectronic module manager may include processing logic that may perform method 400.

At block 405, processing logic may identify an optoelectronic module in a management network, such as the management network 100 of FIG. 1. In at least one embodiment, the management network includes a network that is dedicated to the management of the optoelectronic module and may be separate from a network (or other communications devices) through which the optoelectronic module may send and receive data. The processing logic may identify the optoelectronic module in response to the optoelectronic module powering on and/or connecting to the management network. The processing logic may identify the optoelectronic module in response to receiving a HELLO message sent by the optoelectronic module over the management network. The HELLO message may more generally include a message transmitted by the optoelectronic module to notify the management network of its existence. In at least one embodiment, the processing logic may identify the optoelectronic module by periodically sending a ping to the management network for any connected (or newly connected) optoelectronic module s. The optoelectronic module may receive the ping and may send a response or an ACK message to the processing logic. In at least one embodiment, the processing logic may extract and/or identify an identifier of the optoelectronic module from any HELLO message, response, ACK message, or other communication(s) received from the optoelectronic module. The identifier of the optoelectronic module may include an alphanumeric string of characters, an address, or other information to uniquely identify the optoelectronic module.

At block 410, the processing logic may add the optoelectronic module to a list of monitored devices. The processing logic may create the list or may add the optoelectronic module to an existing list. In at least one embodiment, the processing logic may add an identifier of the optoelectronic module to the list. In at least one embodiment, the processing logic may identify an attribute to be monitored. The processing logic may store the attribute to be monitored in the list in relation to the optoelectronic module. The attribute may be related to the optoelectronic module. Example attributes may include: a power state of the optoelectronic module, an operation state of the optoelectronic module, a software or firmware attribute (e.g., version number) of the optoelectronic module, a performance attribute of the optoelectronic module, a potential or actual failure of the optoelectronic module, characteristics of devices or optical cables connected to the optoelectronic module, characteristics of data transmissions through optical cables connected to the optoelectronic module, a performance attribute of the electrical and optical data signals the optoelectronic module carries/processes, a performance attribute of the other optoelectronic module(s) the optoelectronic module 105 transmits to/receives from the other end of the fiber link, or other attribute.

At block 415, the processing logic may monitor the optoelectronic module. Monitoring the optoelectronic module may include monitoring an attribute related to the optoelectronic module (e.g., the monitored attribute), which monitored attribute may include the attribute to be monitored discussed above with respect to block 410. In at least one embodiment, the processing logic may periodically monitor the optoelectronic module by sending a status request to the optoelectronic module and requesting a status response from the optoelectronic module. In at least one embodiment, the processing logic and the optoelectronic module may both have access to a shared storage (e.g., a message queue). The processing logic may send status requests to the shared storage and the optoelectronic module may obtain the status requests from the shared storage. The optoelectronic module may send status responses to the shared storage and the processing logic may retrieve the status responses from the shared storage. In at least one embodiment, the processing logic may send a list of attributes to be monitored to the optoelectronic module. The optoelectronic module may send information pertaining to the attributes to be monitored to the processing logic and/or to the shared storage. For example, an attribute to be monitored may include a characteristic of a data transmission (e.g., a transmission speed) through optical cables connected to the optoelectronic module. The optoelectronic module may report some or all of the transmission speeds through the optical cables. In at least one embodiment, the optoelectronic module may report to the processing logic transmissions above a maximum transmission threshold or below a minimum transmission threshold.

At block 420, the processing logic may identify a service to be performed in response to the monitoring of block 415. For example, in response to detecting that the optoelectronic module has been powered on or has completed a series of startup operations, the processing logic may enable operation of the optoelectronic module such that the optoelectronic module may begin sending and/or receiving data via one or more fiber optic cables. In another example, the processing logic may identify a current attribute of the optoelectronic module, such as a current software or firmware version of the optoelectronic module, and identify an update to the software or firmware. Other example services to be performed that may be identified by the processing logic may include identifying remedial action in response to a potential or actual failure of the optoelectronic module, issuing a warning or notifications for failure downtime prevention, switching pull-tabs or bail latches LED(s) ON or OFF, enabling communication between the optoelectronic modules on the two sides of the fiber link, beyond the traffic data they transmit/receive, enabling the optoelectronic module's features that allow the main network to perform self-checks and optimizations, or monitoring and report network performance at optoelectronic module's level (physical layer), etc.

At block 425, the processing logic may provide the service to the optoelectronic module (or cause a service to be provided to the optoelectronic module). The service may include the service to be performed identified at block 420. To provide the service to the optoelectronic module, the processing logic may send a set of instructions and/or other data that pertain to the service. For example, the instructions may include a set of commands to update software or firmware and the other data may include the update and/or a link (e.g., URL) to the update. The instructions may also include an instruction to restart or reboot the optoelectronic module in response to a failure of the optoelectronic module. In at least one embodiment, the optoelectronic module may send a message to the processing logic indicative of the service being completed. For example, the optoelectronic module may inform the processing logic that the optoelectronic module was rebooted, that software or firmware was updated, etc.

At block 430, the processing logic may generate a report of the service provided to the optoelectronic module. The report may include an identifier of the optoelectronic module, monitored attributes of the optoelectronic module, services provided or performed, etc. The report may be text-based, graphical-based, or a combination thereof. In at least one embodiment, the processing logic may generate the report for display in a graphical user interface (GUI). In at least one embodiment, the processing logic may send or provide the report to a system administrator.

FIG. 5 illustrates a flow diagram of an example method 500 to perform a service received from an optoelectronic module manager (e.g., the optoelectronic module manager 140 of FIG. 1). The method 500 may be performed, for example, by the management communication element 115 of the optoelectronic module 105 of FIG. 1, or another computer system or device. The optoelectronic module may also include an optical communication element (e.g., optical communication element 110). The optical communication element may include processing logic that may perform method 500.

At block 505, processing logic may receive a status request for a monitored attribute of an optoelectronic module. The status request may originate at an optoelectronic module manager (e.g., the optoelectronic module manager 140 of FIG. 1). The status request may include the status request described with respect to FIG. 4.

At block 510, the processing logic may identify a status of the monitored attribute. To identify the status of the monitored attribute, the processing logic may examine software and/or hardware of the optoelectronic module. For example, the processing logic may examine a transmission rate of data through an optical communication element (e.g., optical communication element 110 of FIG. 1). In another example, the processing logic may identify a current software or firmware version of the optoelectronic module. In another example, the processing logic may identify laser bias, receiver bias, or other settings applied during conversion by the optoelectronic module of electrical signals to optical signals and/or during conversion by the optoelectronic module of optical signals to electrical signals.

At block 515, the processing logic may send the status of the monitored attribute, via the management communication element, to the optoelectronic module manager. For example, the processing logic may send the current software or firmware version of the optoelectronic module to the optoelectronic module manager.

At block 520, the processing logic may receive an instruction pertaining to the monitored attribute. For example, the processing logic may receive an instruction to initiate a software update. The processing logic may alternatively or additionally receive data relating to the instruction, such as the software update or a link to the software update. At block 525, the processing logic may execute the instruction.

At block 530, the processing logic may send a message indicating the execution of the instruction to the optoelectronic module manager. For example, the message may include a time of the start and/or completion of the execution of the instruction, an identifier of the optoelectronic module, etc.

Figure 6:
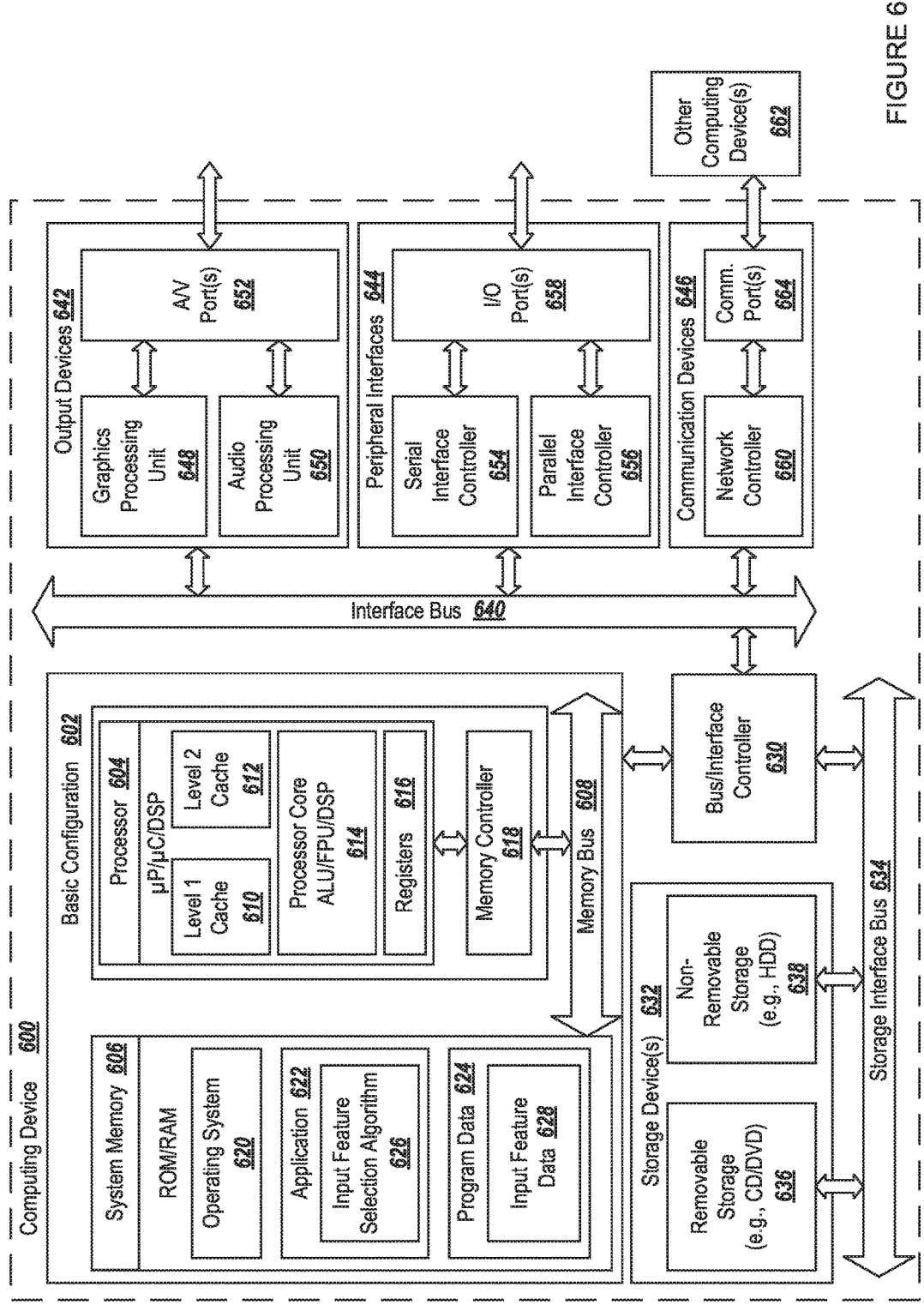
FIG. 6 is a block diagram illustrating an example computing device that is arranged for optoelectronic module management, arranged in accordance with at least one embodiment described herein.

FIG. 6 is a block diagram illustrating an example computing device 600 that is arranged for optoelectronic module management, arranged in accordance with at least one embodiment described herein. The computing device 600 may include or correspond to the server 135 or other device or system in any of FIGS. 1-3. In a basic configuration 602, the computing device 600 typically includes one or more processors 604 and a system memory 606. A memory bus 608 may be used to communicate between the processor 604 and the system memory 606.

Depending on the desired configuration, the processor 604 may be of any type including, but not limited to, a microprocessor (μP), a microcontroller (μC), a digital signal processor (DSP), or any combination thereof. The processor 604 may include one or more levels of caching, such as a level one cache 610 and a level two cache 612, a processor core 614, and registers 616. The processor core 614 may include an arithmetic logic unit (ALU), a floating point unit (FPU), a digital signal processing core (DSP Core), or any combination thereof. An example memory controller 618 may also be used with the processor 604, or in some implementations the memory controller 618 may include an internal part of the processor 604.

Depending on the desired configuration, the system memory 606 may be of any type including, but not limited to, volatile memory (such as RAM), nonvolatile memory (such as ROM, flash memory, etc.), or any combination thereof. The system memory 606 may include an operating system 620, one or more applications 622, and program data 624. The application 622 may include a platform management module 626 that may include or correspond to one or more of the optoelectronic module manager 140 and/or the management communication element 115 and that is arranged to perform one or more of the operations described herein. The program data 624 may include optoelectronic module management data 628 as is described herein, or other optoelectronic module management data. In some embodiments, the application 622 may be arranged to operate with the program data 624 on the operating system 620 such that the methods 400 and 500 of FIGS. 4 and 5, respectively, may be provided as described herein.

The computing device 600 may have additional features or functionality, and additional interfaces to facilitate communications between the basic configuration 602 and any involved devices and interfaces. For example, a bus/interface controller 630 may be used to facilitate communications between the basic configuration 602 and one or more data storage devices 632 via a storage interface bus 634. The data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 606, the removable storage devices 636, and the non-removable storage devices 638 are examples of computer storage media or non-transitory computer-readable medium or media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by the computing device 600. Any such computer storage media or non-transitory computer-readable media may be part of the computing device 600.

The computing device 600 may also include an interface bus 640 to facilitate communication from various interface devices (e.g., output devices 642, peripheral interfaces 644, and communication devices 646) to the basic configuration 602 via the bus/interface controller 630. The output devices 642 include a graphics processing unit 648 and an audio processing unit 650, which may be configured to communicate to various external devices such as a display or speakers via one or more A/V ports 652. The peripheral interfaces 644 include a serial interface controller 654 or a parallel interface controller 656, which may be configured to communicate with external devices such as input devices (e.g., keyboard, mouse, pen, voice input device, touch input device, etc.), sensors, or other peripheral devices (e.g., printer, scanner, etc.) via one or more I/O ports 658. The communication devices 646 include a network controller 660, which may be arranged to facilitate communications with one or more other computing devices 662 over a network communication link via one or more communication ports 664.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 600 may be implemented as a portion of a small-form factor portable (or mobile) electronic device such as a smartphone, a personal data assistant (PDA), or an application-specific device. The computing device 600 may also be implemented as a personal computer including both laptop computer and non-laptop computer configurations, or a server computer including both rack-mounted server computer and blade server computer configurations.

Embodiments described herein may be implemented using computer-readable media for carrying or having computer-executable instructions or data structures stored thereon. Such computer-readable media may be any available media that may be accessed by a general-purpose or special-purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable media.

One skilled in the art will appreciate that, for this and other processes and methods disclosed herein, the functions performed in the processes and methods may be implemented in differing order. Further, the outlined steps and operations are only provided as examples, and some of the steps and operations may be optional, combined into fewer steps and operations, or expanded into additional steps and operations without detracting from the essence of the disclosed embodiments.

Computer-executable instructions may include, for example, instructions and data which cause a general-purpose computer, special-purpose computer, or special-purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general-purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, various changes, substitutions, and alterations could be made hereto without departing from the spirit and scope of the invention.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optoelectronic module management system comprising:
   a network connection communicatively coupled to an optoelectronic module;
   a memory;
   an optical communication transceiver that is communicatively coupled to a fiber optic cable; and
   a processing device operatively coupled to the memory, the processing device configured to perform or control performance of operations comprising:
   identify the optoelectronic module via a management network, wherein the optoelectronic module comprises a management communication transceiver that is communicatively coupled to the management network, wherein the fiber optic cable is associated with a network that is different than the management network;
   add the optoelectronic module to a list of monitored devices;
   monitor the optoelectronic module via the management network;
   in response to the monitoring, provide a service to the optoelectronic module via at least one of the management network and the fiber optic cable; and
   generate a report of the service provided to the optoelectronic module.

2. The optoelectronic module management server of claim 1, wherein when identifying the optoelectronic module via the management network, the processing device is configured to receive a HELLO message from the optoelectronic module.

3. The optoelectronic module management server of claim 1, wherein when monitoring the optoelectronic module, the processing device is configured to:
   send a status request to the optoelectronic module; and
   receive a status response from the optoelectronic module.

4. The optoelectronic module management server of claim 3, wherein the status request includes a request for an attribute of the optoelectronic module, wherein the status response includes a status of the attribute of the optoelectronic module.

5. The optoelectronic module management server of claim 1, wherein the management communication transceiver is wirelessly coupled to a wireless hub, wherein the wireless hub is coupled to the optoelectronic module management server via the Internet.

6. The optoelectronic module management server of claim 1, wherein the management communication transceiver is coupled to the Internet via a cellular network, wherein the management communication transceiver is coupled to the optoelectronic module management server via the cellular network and the Internet.

7. The optoelectronic module management server of claim 1, wherein the report of the service provided to the optoelectronic module is to be presented via a graphical user interface to a system administrator.

8. An optoelectronic module, comprising:
   an optical communication transceiver that is communicatively coupled to a fiber optic cable;
   a management communication transceiver that is communicatively coupled to an optoelectronic module manager via a management network that includes at least one wireless network in a networking plane that is separate from the fiber optic cable;
   a memory; and
   a processor, operatively coupled to the memory, the processor being configured to perform or control performance of operations comprising:
   receive, from the optoelectronic module manager and via the management network, a status request for a monitored attribute;
   identifying a status of the monitored attribute;
   sending a status response of the monitored attribute, via the management communication transceiver and the management network, to the optoelectronic module manager in response to the status request;
   receive an instruction pertaining to the monitored attribute via at least one of the management network or the fiber optic cable;
   execute the instruction; and
   send a message indicating the execution of the instruction to the optoelectronic module manager via the management network.

9. The optoelectronic module of claim 8, wherein the management communication transceiver is communicatively coupled to a wireless hub via the management network, wherein the wireless hub is coupled to the optoelectronic module management server via the Internet.

10. The optoelectronic module of claim 8, wherein the at least one wireless network includes a cellular network, wherein the management communication transceiver is coupled to the Internet via the cellular network, wherein the management communication transceiver is coupled to the optoelectronic module management server via the cellular network and the Internet.

11. The optoelectronic module of claim 8, wherein the monitored attribute includes a software, firmware or hardware characteristic of the optoelectronic module.

12. The optoelectronic module of claim 8, wherein the monitored attribute includes a characteristic of a data transmission through the fiber optic cable connected to the optical communication transceiver.

13. The optoelectronic module of claim 8, wherein the monitored attribute includes a characteristic of a device connected to the optoelectronic module.

14. A method comprising:
    identifying an optoelectronic module that has connected to a fiber optic network and to a management network, wherein the fiber optic network is associated with a network that is different than the management network;
    adding the optoelectronic module to a list of monitored devices;
    monitoring the optoelectronic module via the management network;
    in response to the monitoring, providing a service to the optoelectronic module in response to the monitoring via at least one of the management network and the fiber optic network; and
    generating a report of the service provided to the optoelectronic module.

15. The method of claim 14, wherein when identifying the optoelectronic module via the management network, the processing device is configured to receive a HELLO message from the optoelectronic module.

16. The method of claim 14, wherein monitoring the optoelectronic module, comprises:
    sending a status request to the optoelectronic module; and
    receiving a status response from the optoelectronic module.

17. The method of claim 16, wherein the status request includes a request for an attribute of the optoelectronic module, wherein the status response includes a status of the attribute of the optoelectronic module.

18. The method of claim 14, wherein the optoelectronic module is wirelessly coupled to a wireless hub, wherein the wireless hub is coupled to an optoelectronic module management server via the Internet.

19. The method of claim 14, wherein the optoelectronic module is coupled to the Internet via a cellular network, wherein the optoelectronic module is coupled to an optoelectronic module management server via cellular network and the Internet.

20. The method of claim 14, wherein the report of the service provided to the optoelectronic module is to be presented via a graphical user interface to a system administrator.

* * * * *